United States Patent Office 3,006,884
Patented Oct. 31, 1961

3,006,884
POLYURETHANE RESINOUS MATERIALS
Leslie Nathan Phillips, Farnborough, England, assignor to National Research Development Corporation, London, England, a British corporation
No Drawing. Filed Dec. 30, 1958, Ser. No. 783,663
Claims priority, application Great Britain Jan. 3, 1958
5 Claims. (Cl. 260—45.75)

This invention relates to the manufacture of polyurethane resins, which term is to be understood to include both adduct intermediate resins which are unreacted or partially reacted mixtures of polyols and diisocyanates, and the end products of the reactions by which the adducts are cured or crosslinked.

In general the polyurethane forming reaction between polyols and isocyanates, in particular between long chain glycols and diisocyanates, or polyesters and diisocyanates is facilitated by the use of an agent for stimulating or completing the well known crosslinking process, the agent being commonly added to an adduct comprising the polyol and diisocyanate. One desirable use of polyurethanes produced in this way is a flexible elastic coatings but one limitation attached to this use has been the tendency of the curing reaction to generate gas bubbles which has resulted in end products which are cellular in some degree.

Various proposals connected with the making of non-cellular or void-free elastic polyurethane products, especially thin films or sheet material have been made, for example those described in the provisional specifications of co-pending application Nos. 24513/57 and 308/58 which are concerned with the production of room temperature stable adducts, and No. 30364/57 in which a method is disclosed for shortening the time required for the cross-linking curing reaction of an adduct by reacting it with a catalytic polyol containing a tertiary nitrogen atom and hydroxyl groups.

According to the present invention a polyurethane adduct in the form of a reaction product of a long chain polyol and diisocyanate is modified by the admixture of an antimony compound as a storage stabilising and crosslinking cure accelerating agent.

Antimony chlorides, in particular trichloride and perchloride, have proved especially advantageous in performing the invention.

The admixture of an antimony chloride has been found to give room temperature stability to an adduct sealed from the air and to reduce the room temperature curing time, which time may be, in the case where the adduct is of the type for use in the manufacture of thin films or sheet material, as short as 36 hours.

In one example according to the invention an adduct was first made by reacting 200 gm. of the alkyd resin, polyethylene glycol/neopentyl glycol/adipate in turn with 20.0 gm. of naphthalene diisocyanate and 20 ml. of toluylene diisocyanate disolved in 200 ml. of toluene and 200 ml. of dichlorobenzene. For the purpose of ascertaining the benefit of modification of the adduct according to the invention, half of the adduct was modified by the admixture of approximately 20 ml. of a 1⅓% solution of antimony perchloride in methyl isobutyl ketone whilst the other half was unmodified. Films and thin sheet material were then prepared from the modified and unmodified adducts and curing permitted to take place at room temperature. After 24 hours the modified adduct materials were partially cured and sufficiently mechanically strong and elastic to be stripped from their former surfaces and after a further 12 hours were substantially completely cured. In contrast the unmodified adduct remained in a substantially tacky and uncured, or only light cured, condition after 48 hours, and was too weak mechanically to be removed from the former surfaces.

In another example similar to the first 10 ml. of the adduct composition was mixed with 1 ml. of a curing agent composition consisting of a 2% weight/volume solution of antimony trichloride dissolved in anhydrous Cellosolve acetate. The mixture was then applied to various moulding surfaces to form thin films and allowed to sand at room temperature overnight. In 15 hours the films had hardened considerably and were fully cured by heating for 2 hours at 80° C. in an air oven, a tough, elastic, void full tear resistant rubber like film being thereby obtained in each case. As in the first example a portion of the adduct composition without the curing agent was employed as a control. The films made from this appeared to be touch dry overnight but melted completely on heating and remained uncured after heating for 36 hours.

Further similar examples were performed employing proportions of the agents in weight/volume solutions of ⅓, ½, 1, 2, 3, 4, and 5% and it was found that at ⅓% the improvement in curing was too solw to be of value and at 5% the cure resulted in the formation of small bubbles and a discolouration of the cured film on immersion in water. The useful range is approximately from ¾ to 3½%, depending on the circumstance.

It will be appreciated that the useful absolute proportions of the antimony compound in relation to the active constituents of the adduct, i.e. the alkyd and the diisocyanates (to the exclusion of the solvents) is very small and lies in the range 0.08 to 0.5% weight/volume. The use of solvents in adding the compound is highly desirable in order to ensure accurate proportioning and thorough dispersion of the agent through the adduct before any reaction can take place.

Samples of the modified and unmodified adducts were also tested for room temperature storage stability in glass bottles and it was found that the modified adduct developed only a surface skin of elastic resin whilst the bulk of the liquid adduct remained substantially wholly uncured and capable of further reaction, whereas the unmodified adduct became a gel-like and unusable mass in a relatively short time.

I claim:

1. A method of improving the storage stability and cross-linking cure characteristics of a polyurethane adduct formed as the reaction product of a linear polyol and a diisocyanate, comprising mixing about 0.08–0.5% in weight/volume ratio of a hydrolisable antimony chloride with said reaction product after it has been formed.

2. A method according to claim 1 wherein antimony trichloride is mixed with the reaction product.

3. A method according to claim 2 wherein the trichloride is mixed with the reaction product as a methyl isobutyl ketone solution.

4. A method according to claim 1 wherein antimony perchloride is mixed with the reaction product.

5. A method according to claim 4 wherein the perchloride is mixed with the reaction product as a methyl isobutyl ketone solution.

References Cited in the file of this patent

UNITED STATES PATENTS

| 2,577,281 | Simon et al. | Dec. 4, 1951 |
| 2,620,349 | Slocombe | Dec. 2, 1952 |
| 2,729,618 | Muller et al. | Jan. 3, 1956 |

FOREIGN PATENTS

| 929,507 | Germany | June 27, 1955 |